Sept. 13, 1955 W. A. GERHART 2,717,415
DEVICE FOR PALLETIZING PLASTIC MATERIALS
Filed Oct. 28, 1953

INVENTOR.
WILLIAM A. GERHART
BY
*Barnes, Kisselle, Laughlin & Raisch*
ATTORNEYS.

2,717,415
DEVICE FOR PALLETIZING PLASTIC MATERIALS

William A. Gerhart, Harbor Springs, Mich.

Application October 28, 1953, Serial No. 388,888

11 Claims. (Cl. 17—32)

This invention relates to a device for separating a body of plastic material such as dough or ground meat into a number of similarly shaped smaller bodies and palletizing the smaller bodies. The invention is exemplified by the making of a number of hamburger patties from a single body of ground meat.

In a restaurant or similar establishment, it is often desirable to have a relatively large number of pre-shaped hamburger patties immediately available for cooking. It is desirable that the patties be of substantially the same size and that they be in condition for easy quick handling. It is an object of this invention to provide a simply operated, inexpensive device for preparing large numbers of hamburger patties of substantially the same size from a mass of ground meat and for palletizing the patties so that they can be easily, quickly, and sanitarily handled.

In accordance with the invention, a number of pallets are removably mounted in axially spaced parallel planes on a base; a holder adapted to hold a body of ground meat is mounted on the base and is movable toward the pallets so that the pallets may penetrate the body of meat and separate it into a number of patties of equal thickness. Means are provided for removing the pallets and patties as a unit from the base and holder, thus providing a stack of individually palletized patties which may be handled individually or by the stack. One form of the invention is shown in the accompanying drawings:

Figure 4:
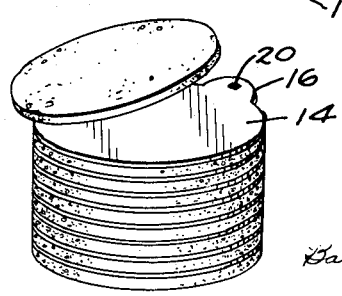

Fig. 4 perspectively illustrates a stack of palletized hamburger patties removed from the base and meat holder.

The device shown in the drawings has a base 10 which is preferably made of a solid block of wood with a plurality of equidistantly spaced slots 12 therein. For each slot there is a circular disc shaped pallet 14 having at its periphery the projection 16. Each projection fits nicely within a slot 12 and the pallets are thus arranged in equidistantly spaced parallel planes which lie perpendicular to the base 10. The pallets are removably secured into this position by such means as a rectangular pin 18 passing through a rectangular opening 20 in each projection and through portions 22 of the base 10 adjacent thereto. Means for vibrating the pallets may be provided and may comprise a motor 19 mounted on the base 10, and an eccentric 21 on the motor connectable to the pin 18 by an element 23.

Figure 1:
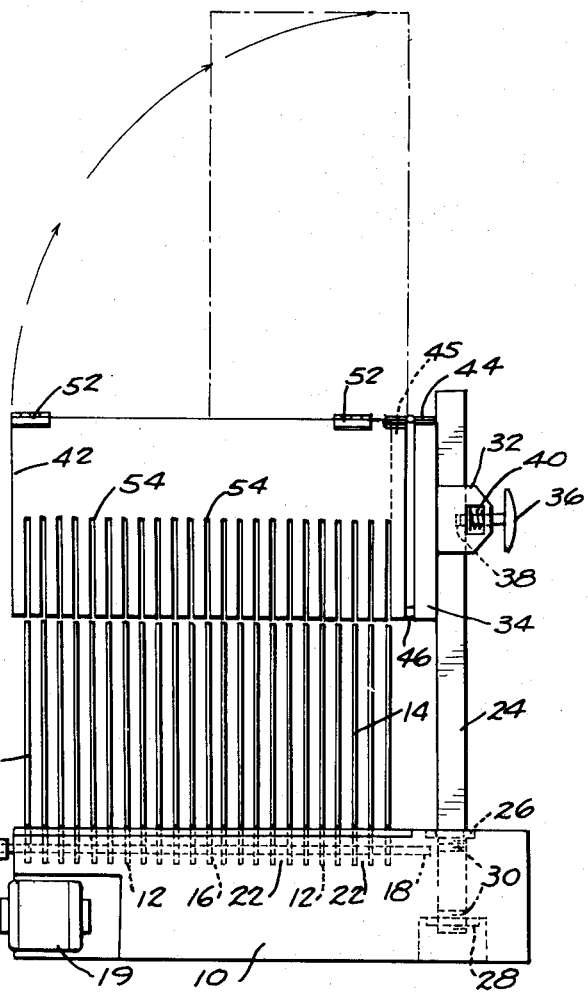
Fig. 1 is an elevational and partly diagrammatic view of the invention showing its various parts.

A rectangular guide or support post 24 extends generally perpendicularly from the top of the base 10 and may be secured to the base by nuts 26 and 28 engaging threads 30 on the post as shown in Fig. 1. A slide 32 is slidably mounted on the guide post and has a stabilizing block portion 34 which engages one face of the post over a substantial longitudinal distance. The slide has a detent member 36 yieldably held in engagement with a recess 38 in the post 24 by a spring 40 to lock the slide in an elevated position for a purpose which will later appear.

A meat holder 42, which conveniently comprises a cylindrical tube, is secured to the block 34 on the slide through a hinge 44 so that the holder may be swung to the horizontal position shown in solid lines in Fig. 1 or to the vertical loading position shown in broken lines. An end plate 45 closes the hinged end of tube 42. A stop 46 may be provided for properly positioning the holder when it is in its horizontal position. The meat holder tube has two portions 48 and 50 hinged together as shown at 52 on an axis parallel to the axis of the tube; the portions may be swung to the closed position shown in solid lines in Figs. 2 and 3 or to the open position illustrated in broken lines in Fig. 3. Latch means (not shown) may be provided for securing the tube portions in closed relation. The tube has a plurality of axially spaced slots 54 extending substantially 180 degrees around its periphery and lying in radial planes in alignment with the planes of the slots 12 in the base 10. The slots 54 have slightly larger diameter than pallets 14 and are dimensioned to nicely fit the sides of the pallets 14.

Figure 2:
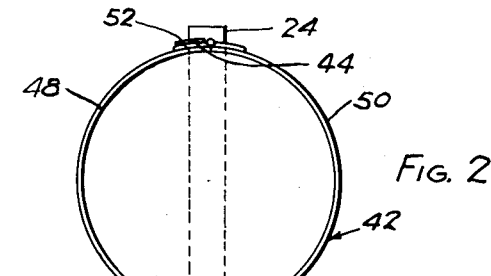
Fig. 2 is an end view showing the relation of the parts before the work stroke.

In use the slide 32 and hence the meat holder tube 42 are locked into the elevated position shown in Figs. 1 and 2 by engagement of the detent 36 and recess 38 in the post 24. The tube is raised to its vertical loading position with its portions 48 and 50 in closed relation. Ground meat is packed into the tube, for example through its upper end. The projections 16 on the pallets 14 are inserted into the slots 12 in the base 10 and are secured into position by inserting the pin 18 through the aligned openings 20 in the projections and the adjacent portions 22 of the base. The loaded meat holder tube is swung back to the horizontal and is properly positioned by the stop 46. In this position, the slots 54 in the tube are aligned with the pallets 14.

Figure 3:
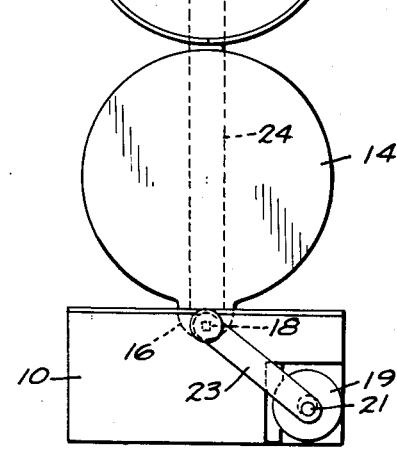
Fig. 3 is an end view of the device illustrating the relation of the parts after the work stroke.

With the vibrator element 23 connected to the pin 18, the motor 19 is turned on to vibrate the pallets, the detent 36 is manually withdrawn from the recess 38, and the meat holder tube is forced downwardly so that the pallets enter the slots 54 and cut or divide the ground meat into a number of circular segments or patties of equal thickness. This may be termed the work stroke and upon completion thereof the pallets, except for their projections 16, are completely inside of the tube 42 (Fig. 3). The movement of the tube during the work stroke is properly guided relatively to the base 10 by interengagement of the slide 32 and guide post 24. Vibrating the pallets lessens the force required to pass the pallets through the meat and lessens the tendency for the meat to adhere to the pallets.

The pin 18 is then removed, releasing the pallets from the base 10, and the meat holder tube is elevated until the detent 36 snaps back into the recess 38 under action of the spring 40. The pallets 14 embedded in the meat are carried with the tube. The tube is swung to its vertical position and is opened by hinging the portions 48 and 50 away from each other. The stack of meat patties and pallets may then be removed as a unit from the tube and may be further handled or stored as desired. To remove a patty from the stack for cooking, the top pallet and the patty on it are merely lifted off the top of the stack by means of the projection 16 and carried to the stove. Each pallet 14 thus serves as a spatula facilitating easy sanitary handling of the individual hamburger patty, the projection 16 providing a handle for the spatula.

I claim:

1. A device for making hamburger patties comprising a generally closed container of regular shape and fashioned from a form-retaining material, said container being arranged to be filled with ground meat and having a plurality of equally spaced slots extending around a portion thereof, a support having a base, means mounting said container on said support for rectilinear movement towards and away from said base, said container being mounted on said support with the slotted portion thereof disposed toward said base, a plurality of pallets mounted in spaced-apart, fixed positions on said base to correspond with the slots in said container, said pallets being shaped and dimensioned to correspond generally with the cross section of said container in a plane parallel to the planes of said slots, the arrangement being such that when the container is moved towards said base, said pallets enter said container through said slots and divide the ground meat within the container into a plurality of hamburger patties.

2. The device defined in claim 1 in which said pallets are removably mounted on said base.

3. The device defined in claim 1 wherein said pallets are substantially circular and said holder comprises a cylindrical tube with substantially 180 degrees circumferential slots therein, said pallets having slightly smaller diameter than the inner diameter of the holder.

4. The device defined in claim 3 wherein portions of the tube are adapted to hinge away from each other about an axis parallel to the axis of the tube to provide means facilitating removal of the pallets and hamburger patties as a unit from the container.

5. The device defined in claim 1 including means for oscillating said pallets in the plane thereof.

6. The device defined in claim 1 wherein each of said pallets has an outwardly projecting portion removably secured to said base, said portion being formed to provide a handle when said pallets are removed from said container.

7. A device for dividing a body of plastic material into a plurality of pieces comprising, a body, means forming a plurality of pallets mounted in spaced apart position on said body, support means on said body, a container on said support means, said container being adapted to contain a plastic material, said container having slotted means spaced apart to correspond to the spacings of said pallets, said pallets being formed to fit within said slotted means, said body and container being movable relatively to each other for inserting said pallets into said slotted means, whereby to divide a plastic material in said container into a plurality of pieces.

8. A device for making and palletizing hamburger patties comprising, a base, means forming a plurality of pallets removably mounted on said base, said pallets being disposed in fixed spaced apart positions on said base, a support means on said base, a container on said support means, said container being adapted to contain ground meat, said container having slotted means spaced apart to correspond to the spacings of said pallets, said pallets being formed to fit within said slotted means, said body and container being movable relatively to each other for inserting said pallets into said slotted means, whereby to divide ground meat within said container into a plurality of hamburger patties, said container being formed of separable sections so that said pallets and the hamburger patties thereon can be removed from said container in stacked relation.

9. The device defined in claim 8 wherein said container has an open end for receiving ground meat.

10. The device defined in claim 8 wherein said base and container are substantially horizontally parallel with said container being hinged on said support for swinging to vertical position to facilitate removal of said pallets and hamburger patties therefrom.

11. A device for making hamburger patties comprising, a generally closed container of regular shape and fashioned from a form retaining material, said container being arranged to be filled with ground meat and having a plurality of equally spaced slots extending around a portion thereof, a support having a base, a plurality of pallets mounted in spaced apart fixed positions on said base to correspond with the slots in said container, means mounting said container on said support for rectilinear movement toward and away from said pallets, said container being mounted on said support with the slotted portion thereof disposed toward said pallets, said pallets being shaped and dimensioned to correspond generally with the cross section of said container in a plane parallel to the planes of said slots, the arrangement being such that when the container is moved toward said pallets, said pallets enter said container through said slots and divide the ground meat within the container into a plurality of hamburger patties.

References Cited in the file of this patent
UNITED STATES PATENTS

| | | |
|---|---|---|
| 682,243 | Cuscaden et al. | Sept. 10, 1901 |
| 1,182,040 | Ritthamer | May 9, 1916 |
| 1,629,295 | Oertel | May 17, 1927 |
| 2,076,488 | Wiley | Apr. 6, 1937 |
| 2,127,404 | Gullich | Aug. 16, 1938 |
| 2,654,121 | Nelson | Oct. 6, 1953 |